United States Patent [19]

Vohrer

[11] Patent Number: 4,526,410

[45] Date of Patent: Jul. 2, 1985

[54] PLASTIC CONNECTOR FOR HOSES

[76] Inventor: Christoph Vohrer, Hattsteiner Str. 22, d-6240 Konigstein 2, Fed. Rep. of Germany

[21] Appl. No.: 444,898

[22] PCT Filed: Mar. 15, 1982

[86] PCT No.: PCT/DE82/00056

§ 371 Date: Nov. 16, 1982

§ 102(e) Date: Nov. 16, 1982

[30] Foreign Application Priority Data

Mar. 18, 1981 [DE] Fed. Rep. of Germany ....... 3110494

[51] Int. Cl.$^3$ ............................................. F16L 39/02
[52] U.S. Cl. ............................ 285/149; 285/DIG. 16
[58] Field of Search ............... 285/149, DIG. 16, 331; 138/109

[56] References Cited

U.S. PATENT DOCUMENTS

| 2,277,397 | 3/1942 | Graham | 285/149 X |
|---|---|---|---|
| 2,447,697 | 8/1948 | Gotschall | 138/109 X |
| 2,561,351 | 7/1951 | Fentress . | |
| 3,224,795 | 12/1965 | Conley | 138/109 X |
| 3,757,827 | 9/1973 | Seiwert et al. | 138/109 |

FOREIGN PATENT DOCUMENTS

| 807575 | 7/1951 | Fed. Rep. of Germany . |
|---|---|---|
| 1425567 | 3/1970 | Fed. Rep. of Germany . |
| 2525254 | 9/1976 | Fed. Rep. of Germany . |
| 2654377 | 6/1978 | Fed. Rep. of Germany . |
| 511989 | 8/1939 | United Kingdom . |
| 595935 | 12/1947 | United Kingdom . |
| 1068485 | 5/1967 | United Kingdom . |

Primary Examiner—Dave W. Arola

[57] ABSTRACT

In a plastic connector for hoses having a wall which is composed of an outer flexible tube, an inner flexible tube, and a helical cavity, which is located, hidden, between these flexible tubes, the connector is designed to be anchored to the wall of the hose, in that a run-out end of the connector, which end is likewise helical in shape, extends into the helical cavity. In order to obtain effective sealing of the helical cavity of the hose, in particular even when reinforcing threads are located on the inner flexible tube, the connector (2) extends, by means of an integrally moulded-on outer sleeve (8), over a portion of the outer flexible tube (3), and fits closely against the latter. An inner sleeve (9) of the connector extends outwards, beyond the outer sleeve, into the inner flexible tube (4), and is joined to the connector, at its connecting-profile, in a leak-proof manner, that is to say, it is joined, best of all, in an integral manner.

9 Claims, 3 Drawing Figures

PLASTIC CONNECTOR FOR HOSES

The invention relates to a plastic connector for hoses. A connector, composed of a plastic which can be injection-moulded, already belongs to the prior art (German Auslegeschrift No. 2,654,377), this connector being for hoses having wall-parts which are composed of an elastomeric material, and having a helical cavity which is located, hidden, in the wall, in which cavity the connector is attached, by the injection-moulding technique, and is positively anchored to the wall of the hose. In detail, the connector is injection-moulded in such a manner that it possesses a helical run-out end, which is injection-moulded into the helical cavity and merges, as the actual connector, integrally into the connecting-profile which is located axially in front of it. Furthermore, it is known, in this context, that during the formation of the helical cavity, by means of reinforcing-spirals running, parallel and spaced apart, between the inner and outer walls of the hose, a short portion of the outer wall, and of the reinforcement, is removed, and a cylindrical plastic sleeve is formed in this region, in contact with the inner wall. This design of the connector prevents, to a substantial extent, the medium, which is to be led through the hose, from penetrating into the cavity of the hose, which can otherwise lead to the destruction of the hose or, if the outer wall, or outer flexible tube, is transparent, at least gives rise to an unsightly appearance. It has been found, however, that, despite filling the helical cavity, in the region of the connector, with the injected helical run-out end, moisture can still penetrate into the cavity, especially when reinforcing threads are located on the inner flexible tube. These reinforcing threads can absorb moisture at the joints between the front end-surface of the hose and the oppositely-located, inner surface of the connector, and they can conduct the moisture into the helical cavity, since these joints have a comparatively small area and, for this reason, seal poorly under certain conditions. If a metal sleeve is additionally pushed over the end of the hose, as known per se, and a further metal sleeve is pushed into the hose, crimping the end of the hose enables the reinforcing threads to be gripped more securely. However, these two metal sleeves significantly increase the cost of manufacture, and do not even enable the helical cavity to be sealed completely, unless they are specially sealed at their points of contact with the injection-moulding.

The helical run-out end of the connector is also intended to produce a hose-connection which is particularly secure in the mechanical sense. However, the problem of kinking the hose, at that end of the connection nearer the hose, is only partially solved by means of the helical run-out. When the outer and inner metal sleeves are additionally used, the problem of kinking is, rather, rendered more acute, since a sudden transition from the virtually rigid sleeves to the flexible hose occurs at that end of these sleeves which is nearer the hose.

In addition, a high-pressure hose-fitting is known, which comprises a hose-sleeve, with the actual connecting-profile, an end, with a thread of the sawtooth type, and a bore, which possesses a comparatively large diameter and adjoins this thread. The bore is continued by a smaller, cylindrical bore, into which it is possible to insert an inner hose-nozzle, which possesses a head-like, thickened end-portion. The hose is pushed onto the hose-nozzle and is installed in the hose-sleeve, with this nozzle, in such a manner that the end-portion produces a seal as a result of line-contact with the conical bore into which it is pressed. In order to ensure the secure attachment of the rubber hose, both the hose-sleeve and the hose-nozzle must be essentially unyielding, so that a small portion of the hose-nozzle, which portion projects beyond the hose-sleeve, cannot deform appreciably, even when the hose is bent. This high-pressure hose-fitting is unsuitable for use with hoses having a wall which is composed of an outer flexible tube, an inner flexible tube, and a helical cavity which is located, hidden, between these flexible tubes, since hoses of this type are not capable of being securely fastened in the fitting. In addition, the fastening operation is laborious and expensive. If a force is applied to the hose, it is bent over in direct proximity to the sleeve, so that it is very highly stressed in this region, up to destruction under certain conditions (German Auslegeschrift No. 1,425,567).

Finally, a one-piece hose-fitting belongs to the prior art, in which fitting the outer and inner nipples are integral with one another. At least one of the nipples possesses, on its side facing the hose, a thread for screwing the fitting onto the hose-end. As a result of permanent deformation of the fitting, the hose-end is clamped to the fitting. This means that the hose-fitting must be composed of a plastically deformable material, which in no way exhibits elastomeric characteristics. The outer and inner nipples extend equal distances towards the hose. This fitting, too, is unsuitable for the leakproof and reliable attachment of a comparatively flexible hose-end having a wall which is composed of an outer flexible tube, an inner flexible tube, and a cavity which is located between these flexible tubes (German Patent Specification No. 807,575).

Furthermore, a connector belongs to the prior art, which is injection-moulded partly over a hose-end, and partly over a rigid inner sleeve, which is plugged into the hose-end, so that it enters into a mechanical connection with that portion of the inner sleeve which extends outwards beyond the end of the hose (U.S. Pat. No. 2,561,351). In the interior of the hose, the outer wall of which is moulded as a spiral, the inner sleeve is moulded with a reduced diameter. However, the inner sleeve still does not even extend so far into the interior of the hose as the mouldedon connector extends over the outer wall. Since the injection-moulded connector is designed to be comparatively thick, and terminates without a gradual transition, there is a particularly high risk of kinking the hose at the end of the connector.

The object pertaining to the present invention is accordingly to provide a plastic connector which is as simple as possible, and is easy to manufacture, which enables the helical cavity of a hose to be sealed particularly effectively, especially a hose of the type in which reinforcing threads are applied to the inner flexible tube, these threads running in essentially the axial direction. At the same time, the intention is to support the end of the hose, at the point of transition to the connector, in such a manner that the risk of kinking the hose in this region is avoided.

Particularly effective sealing of the helical cavity is obtained by means of the outer sleeve, which is integrally moulded as a projecting portion of the connector and which fits closely over the outer flexible tube, in association with the inner sleeve, which extends into the inner flexible tube, fits closely against it, and is joined to the connector, in a leakproof manner, in the region of the connecting-profile. In this arrangement, the effective sealing surfaces, resulting from the portions of the outer and inner sleeves which are in contact, respectively, with the outer and inner flexible tubes, are, in fact, particularly large. Moreover, the seal is not disturbed by any ability of moisture to penetrate between the inner sleeve and the connector, in the region of the connecting-profile. Consequently, no moisture enters the helical cavity, which moisture is mechanically detrimental to the hose, in the long term, and is also detrimental, in the short term, from the aesthetic point of view. At the same time, effective support of the hose, in the region of its greatest stressing, is achieved by means of the inner sleeve, which projects into the inner flexible tube and extends outwards beyond the region of the outer sleeve. The support is particularly effective because a comparatively long distance, for transferring the forces between the end of the outer sleeve and the unsupported hose, can be obtained without designing the connector in a manner which would be externally unsightly. Furthermore, the sealing effect is improved by virtue of the fact that the inner sleeve extends further into the hose than the outer sleeve extends over it, since the medium which is present in the hose, under pressure, is, as a rule, more difficult to seal off than the outside of the hose. The support of the hose, in its most highly stressed region, is effected in a gentle manner, since the inner sleeve is composed of a resilient plastic. There is accordingly no longer any need to fear, in particular, the breakage, kinking or splitting of shower-hoses downstream of the connector.

The connector in which the inner and outer sleeves, the helical run-out end and the connecting-profile are integrally moulded from plastic is particularly practical. As a result of moulding the connector in one piece, any joint-surfaces, which would have to be sealed, are entirely avoided between the abovementioned parts, so that the possibility of leaks is reliably excluded at these points.

This one-piece connector is, with particular advantage, cast from plastic. By this means, a particularly simple procedure for manufacturing the connector, with its connection to the end of the hose, is achieved, since a separate assembly operation is dispensed with. The seal can be particularly reliable, as a result of the penetration of the cast plastic into the helical cavity. In this manufacturing procedure, the connector is cast directly on the end of the hose, this end being surrounded by a casting mould. At the same time, a core rod belonging to the casting mould projects into the inner flexible tube, in such a manner that an interspace remains between the inner wall of the inner flexible tube and the core rod, into which space the plastic can penetrate. The height to which the casting material, namely the plastic, rises in contact with the inner flexible tube, on the inside, can easily be calculated from the quantity of plastic mixture which is supplied to the casting mould, in particular from the quantity of a blowing agent. In detail, the mould, which later receives the hose-end, is, first of all, closed. A plastic mix is then introduced into the mould, by means of a nozzle. The hose-end which is to be provided with the connector is then inserted, care being taken, if appropriate, to effect an additional seal. The plastic mix reacts in the presence of the hose-end and hardens into the elastic state. Finally, after opening the mould, the end of the hose can be removed from the mould, with the cast-on connector. Reaction-mixes which are initially fluid and subsequently react to completion, forming a resilient solid plastic, are suitable for producing the connectors. Due to the fluid state of the mixes, which have not yet reacted to completion, the material flows into the cavities in the hose-end, which has been introduced into the mould, and fills these cavities, provided that they are not relieved by the core rod. Reaction-mixes which cross-link to form polyurethane are particularly advantageous. For this purpose, a polyhydroxyl compound (polyol) can be used as the main component, together with auxiliary components and additives. As the latter, blowing agents should, in particular, be mentioned, which influence the length of the section of hose in the mould. The intention is to obtain, through the reaction of the component a polyurethane resin foam, of the integral type, with a closed surface, this surface containing as few foamcavities as possible, which should also be as small as possible. In any case, the cavities should not communicate with the surface, and should be separate from one another.

Furthermore, a requirement which must be met is that, during the operation of casting the connector, the castable plastic, which is selected for the connector, enters into a secure, leakproof bond with the outer surface of the outer flexible tube, and with the inner surface of the inner flexible tube.

It is advantageous to cast the connector because, in contrast to injection-moulding, the end of the hose is subjected neither to an increased pressure, nor to high temperatures. Consequently, it cannot be deformed or damaged by pressure and temperature.

In an advantageous modified version of the connector, the inner sleeve, composed of a flexible PVC tube, is pushed into the inner flexible tube, and the connector is injection-moulded, in the region of the connecting-profile, onto one end of the flexible PVC tube, which end projects from the inner flexible tube. In this case, the connector is injection-moulded only onto the outer wall of the outer flexible tube, the exposed endsurface of the flexible tube, and onto the projecting end of the flexible PVC tube. In contrast, the inner sleeve is formed by a flexible PVC tube which is, first of all, introduced separately, the length of this tube being chosen so that it extends outwards, beyond the length of the outer sleeve, to a distance sufficient to make it possible to produce effective sealing against the internal pressure, and a gradual transfer of the forces occurring at the end of the hose. The wall of the flexible PVC tube should be continuous, in order to prevent the medium from being conducted, from the interior of the flexible tube, to its end-surface.

In order to obtain a good seal between the inner wall of the inner flexible tube and the flexible PVC tube, the latter is expediently glued to the inner flexible tube, or is bonded to it by means of a solvent.

Soft PVC, possessing elasticity and exceptional resistance to heat, has proved particularly successful as material for the flexible PVC tube. A similar PVC material is suitable for the injection-moulding of the remaining portion of the connector, or alternatively, a polyester elastomer, which enters into an excellent bond with the flexible PVC tube.

The wall thickness of the flexible PVC tube should be large enough, on the one hand, to allow the flexible tube to be mechanically stressed, in order that it can be bent, in particular, without cross-sectional flattening and, on the other hand, to avoid any unnecessary reduction in the through-flow cross-section of the tube. A wall thickness of 0.7 to 1.3 mm has emerged as particularly advantageous.

In the text which follows, illustrative embodiments of the invention are explained by reference to the drawing, containing three Figures, in which.

Figure 1:
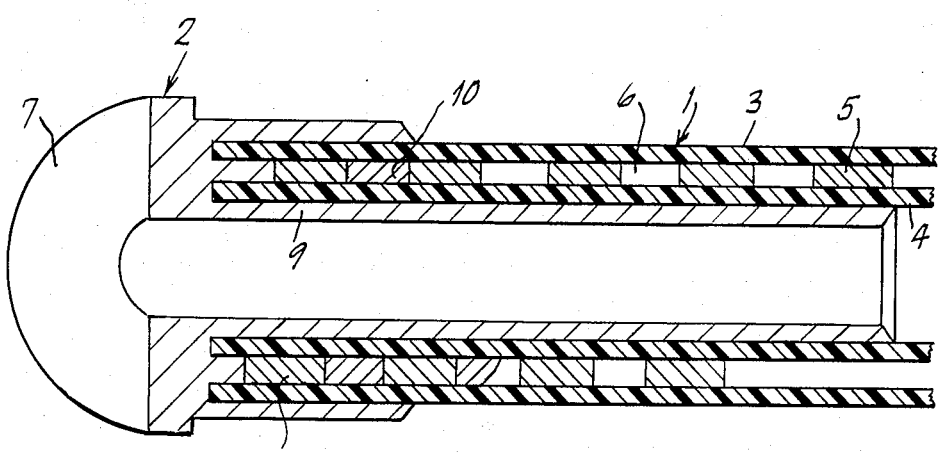
FIG. 1 shows a connector which has been cast, in one piece, on a hose-end.

In FIG. 1, a hose is marked, generally, 1, the end of this hose being provided with a connector which is marked, generally, 2.

The hose is composed, in detail, of an outer flexible tube 3, an inner flexible tube 4, and a reinforcement 5, between the tubes, this reinforcement being in the form of a strip and forming a helical or spiral cavity 6.

The cast connector 2 is composed of the actual connecting-profile or fitting 7, which merges integrally into an outer sleeve 8, on the outer flexible tube, and into an inner sleeve 9 on the inner flexible tube. Between the two flexible tubes, a helical run-out end or projection 10, which is likewise integrally moulded as a projecting portion of the connector, projects into the front portion of the heli-cal cavity 6.

Figure 2:
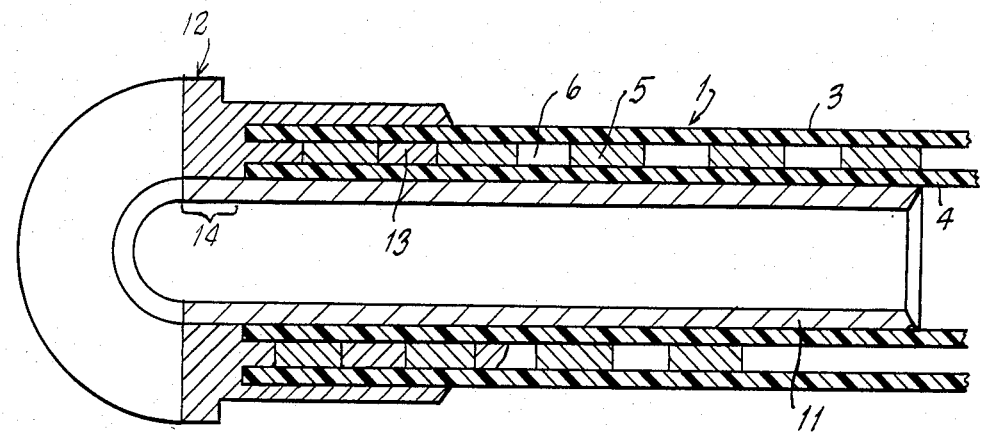
FIG. 2 shows a connector which is injection-moulded onto a hose-end, and a section of flexible tube which has been pushed into this hose-end.

The hose, the end of which is represented in FIG. 2, is designed in the same manner as the hose according to FIG. 1; for this reason, identical parts are provided with corresponding reference numbers.

The connector according to FIG. 2 is designed in two pieces, namely a flexible PVC tube 11, which is pushed into the hose, the front end of this tube projecting from the hose, and a connector 12 which has been injection-moulded onto the projecting end and onto the outer wall of the outer flexible tube 3. This connector likewise extends, by means of a helical run-out end 13, into a number of turns of the cavity 6.

In the embodiment according to FIG. 2, it is important not only that the flexible PVC tube is bonded, in a leakproof manner, to the inner surface of the inner flexible tube 4, for example by gluing, but also that the connector 12, which is applied by injection-moulding, participates in forming a leakproof bond with that end 14 of the flexible PVC tube which projects from the hose.

In the embodiment according to FIG. 2, the connector can also be attached to the hose 1, and to the flexible PVC tube 11, by casting, with the advantages which have previously been mentioned in connection with the casting process.

Figure 3:
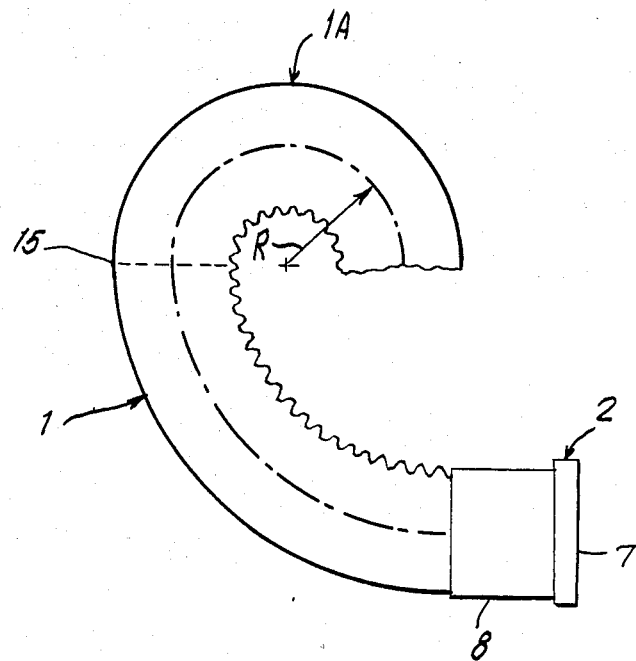
FIG. 3 shows a larger portion of the bent hose-end, with connector.

A larger portion of the stressed, that is to say, the bent hose-end is represented in FIG. 3, this hose-end generally corresponding to the hose-end according to FIG. 1. (The scales of the drawing are different in FIGS. 1 and 3).

From FIG. 3, it is evident, in particular, that the hose, while being subjected to a bending stress, is not kinked at the end of the outer sleeve 8, but runs, in a comparatively large arc, as far as the point 15, at which the inner sleeve ends. In the adjoining region, between the point 15 and the end of the hose, represented as broken-off, the bend radius R is smaller, this being the bend radius of the hose when not additionally supported. This unsupported portion of the hose is marked 1A.

The inner sleeve, which cannot be seen directly from FIG. 3, is preferably dimensioned so that, extending beyond the outer sleeve, it projects into the hose 1 over a portion equal, at the minimum, to $\pi \times R/2$, or, at the maximum, to $\pi \times R$. By this means, the hose is effectively supported in the region of its greatest stress.

The inner sleeve can be composed, in general, of a thermoplastic or elastomeric material, which is, in other words, flexible. In the case of the plastics previously mentioned, a range in which the shear modulus G does not exceed $10^2$ N/mm$^2$ is taken as the elastomeric range.

The invention is suitable for use with hoses having a wall which is composed of an outer flexible tube, an inner flexible tube, and a helical cavity which is located between these flexible tubes, in which hose the outer flexible tube is composed, according to choice, of an elastomer, or of a thermoplastic, and in which the inner flexible tube—independently of the outer flexible tube—is likewise manufactured from an elastomer, or from a thermoplastic.

I claim:

1. A connector for an end of a hose (1) having outer (3) and inner (4) flexible tubes of elastomeric or thermoplastic material and a helical reinforcement (5) between and fastened to the tubes and cooperating therewith to define a helical cavity (6), said connector comprising:
   a. an outer sleeve (8) encircling and fitting closely against the outer flexible tube adjacent said hose end and bonded thereto;
   b. an end fitting (7) integrally joined to the outer sleeve and abutting the ends of the tubes;
   c. a helical projection (13) integrally extending from said fitting into said helical cavity through a plurality of turns thereof; and
   d. an inner sleeve (9 or 11) fitting closely within the inner flexible tube adjacent said hose end and bonded thereto, said inner sleeve having a fluid-tight connection with said end fitting and extending therefrom along the inner wall of the hose for a substantial distance beyond the outer sleeve, so that within that distance, the inner sleeve supports the hose and stiffens it so that its minimum radius of curvature is substantially greater than that of the unsupported hose.

2. Connector according to claim 1, characterized in that the inner sleeve (9), the outer sleeve (8), the helical projection (10) and the end fitting are integral.

3. Connector according to claim 2, characterized in that it is composed of one integral cast plastic part (2).

4. Connector according to claim 1, characterized in that the connector is composed of a plastic which is bonded to the material of the outer flexible tube (3) and with the material of the inner flexible tube (4).

5. Connector according to claim 1, characterized in that the inner sleeve (11) is composed of flexible PVC, and is pushed into the inner flexible tube (4) and has an end (14) projecting beyond the end of the inner flexible tube, and in that the connector (12) is injection-moulded onto said projecting end (14) of the flexible PVC sleeve.

6. Connector according to claim 1, characterized in that the inner sleeve (11) is composed of a flexible PVC.

7. Connector according to claim 1, characterised in that the inner sleeve (11) is of flexible PVC and has a wall thickness of 0.7 to 1.3 mm.

8. Connector according to claim 1, characterized in that the inner sleeve projects into the hose beyond the outer sleeve for a distance equal, at the minimum, to $\pi \times R/2$, in which expression R equals the bending radius of the hose in a region beyond the inner and outer sleeves.

9. Connctor according to claim 8, characterized in that the inner sleeve projects into the hose beyond the outer sleeve, for a distance equal, at the maximum, to $\pi \times R$.

* * * * *